(12) United States Patent
Sellier

(10) Patent No.: US 12,523,565 B2
(45) Date of Patent: Jan. 13, 2026

(54) METHOD FOR DETERMINING THE AERODYNAMIC DRAG SURFACE AND/OR THE ROLLING COEFFICIENT OF A VEHICLE, AND ASSOCIATED MEASURING DEVICE

(71) Applicant: Aeroscale, Grenoble (FR)

(72) Inventor: Manuel Sellier, Grenoble (FR)

(73) Assignee: AEROSCALE, Grenoble (FR)

( * ) Notice: Subject to any disclaimer, the term of this patent is extended or adjusted under 35 U.S.C. 154(b) by 304 days.

(21) Appl. No.: 18/248,311

(22) PCT Filed: Oct. 5, 2021

(86) PCT No.: PCT/FR2021/051725
§ 371 (c)(1),
(2) Date: Apr. 7, 2023

(87) PCT Pub. No.: WO2022/074330
PCT Pub. Date: Apr. 14, 2022

(65) Prior Publication Data
US 2023/0375437 A1    Nov. 23, 2023

(30) Foreign Application Priority Data
Oct. 8, 2020 (FR) ........................... 2010298

(51) Int. Cl.
*G01M 9/06* (2006.01)
*G01M 17/007* (2006.01)

(52) U.S. Cl.
CPC ............ *G01M 9/06* (2013.01); *G01M 17/007* (2013.01)

(58) Field of Classification Search
CPC .............................. G01M 9/06; G01M 17/007
See application file for complete search history.

(56) References Cited

U.S. PATENT DOCUMENTS 5,497,143 A * 3/1996 Matsuo ...................... B62J 6/01
340/432
2012/0221257 A1   8/2012 Froncioni et al.
(Continued)

FOREIGN PATENT DOCUMENTS

FR    2725520 A1   4/1996
GB    2568885 A    11/2017
(Continued)

OTHER PUBLICATIONS

Chung, R., Estimating DdA with a Power Meter, http://anonymous.coward.free.fr/wattage/cda/indirect-cda.pdf, Mar. 2012, 112 pages.
(Continued)

*Primary Examiner* — Timothy P Graves
(74) *Attorney, Agent, or Firm* — TraskBritt

(57) ABSTRACT

A preparatory sequence for determining the aerodynamic drag surface and/or the rolling coefficient of a vehicle in real conditions of movement, without braking, on a road having a point of departure and a point of arrival, comprises:
a) defining a traffic lane with a width less than or equal to 1 m, along the road section,
b) performing, by way of the vehicle, a first movement from the point of departure to the point of arrival in the traffic lane, and measuring:
the speed of the air relative to the vehicle,
the speed of the vehicle at the point of departure and the point of arrival, and
the driving energy supplied by the vehicle along the road section, or considering zero driving energy if the movement is a freewheeling movement.
Five methods may be used for determining the aerodynamic drag surface and/or the rolling coefficient.

14 Claims, 2 Drawing Sheets

(56) References Cited

U.S. PATENT DOCUMENTS

2020/0254307 A1    8/2020  Walthert et al.
2020/0254308 A1*   8/2020  Walthert .................. B62J 45/40

FOREIGN PATENT DOCUMENTS

WO    2007/038278 A1    4/2007
WO    2017/005759 A1    9/2016
WO    2017/055759 A1    4/2017

OTHER PUBLICATIONS

International Search Report for International Application No. PCT/FR2021/051725 dated Feb. 2, 2022, 2 pages.
International Written Opinion for International Application No. PCT/FR2021/051725 dated Feb. 2, 2022, 7 pages.
Martin et al., Aerodynamic Drag Area of Cyclists Determined with Field-Based Measures, Sportscience, vol. 10, (2006), pp. 68-69.

* cited by examiner

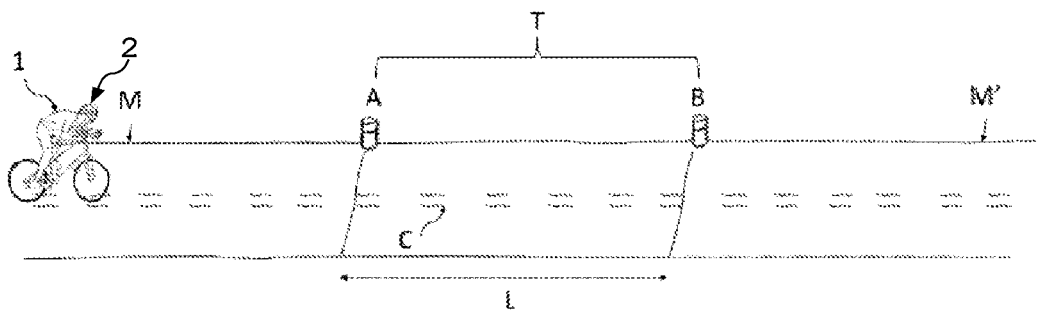
FIG. 1A
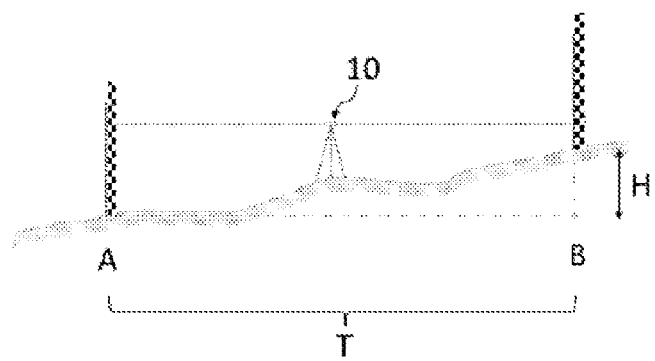
FIG. 1B
| Input Settings | |
|---|---|
| Circumference | 2.083 |
| Length | 48 |
| k_anemo | 1.1 |
| Weight | 63.5 |
| Measured parameters | | | |
|---|---|---|---|
| Path | Trajet1 | Trajet2 | Trajet3 |
| direction | Forward | Return | Forward |
| air density | 1.114 | 1.114 | 1.117 |
| average ground speed | 14.2 | 14.2 | 32.8 |
| average air speed | 15.1 | 14.3 | 32.8 |
| average wind | 0.89 | 0.14 | 0.02 |
| ka | 1.54 | 1.43 | 7.27 |
| kv | 0.15 | 0.95 | 1.33 |
| Calculated parameters | |
|---|---|
| CxS | 0.207 |
| Cr | 0.25% |
| H | -0.415 |
FIG. 2

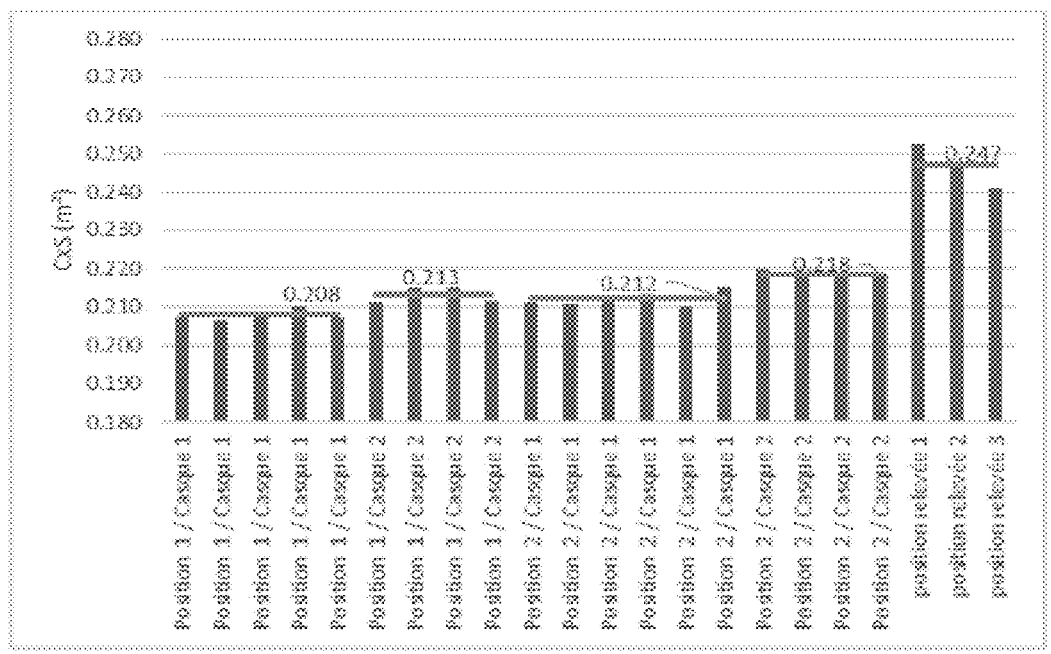
FIG. 3
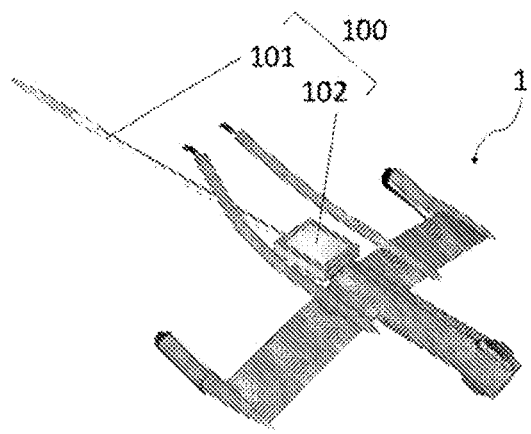
FIG. 4
|  | Staying within the traffic lane | Not staying within the traffic lane |
|---|---|---|
| test #1 | 0.289 | 0.289 |
| test #2 | 0.293 | 0.292 |
| test #3 | 0.291 | 0.284 |
| test #4 | 0.287 | 0.277 |
| test #5 | 0.295 | 0.304 |
| test #6 | 0.283 | 0.271 |
| test #7 | 0.290 | 0.288 |
| test #8 | 0.289 | 0.276 |
| mean | 0.289 | 0.285 |
| standard deviation | 0.003 | 0.010 |
FIG. 5

METHOD FOR DETERMINING THE AERODYNAMIC DRAG SURFACE AND/OR THE ROLLING COEFFICIENT OF A VEHICLE, AND ASSOCIATED MEASURING DEVICE

CROSS-REFERENCE TO RELATED APPLICATIONS

This application is a national phase entry under 35 U.S.C. § 371 of International Patent Application PCT/FR2021/051725, filed Oct. 5, 2021, designating the United States of America and published as International Patent Publication WO 2022/074330 A1 on Apr. 14, 2022, which claims the benefit under Article 8 of the Patent Cooperation Treaty to French Patent Application Serial No. FR2010298, filed Oct. 8, 2020.

TECHNICAL FIELD

The present disclosure relates to the field of devices and methods for measuring and determining forces exerted on a moving vehicle. The present disclosure is particularly aimed at determining the aerodynamic drag surface and/or the rolling coefficient of a cyclist on their bicycle, with precision, reproducibility and implementing a simple and rapid protocol.

BACKGROUND

Accurately measuring the key friction parameters of cyclists (rolling and aerodynamics) remains a major challenge for the cycling industry. Two main categories of test can be envisaged: stationary tests and moving tests.

For stationary tests, the general principle is to set the air or the ground in motion in a simulated manner with the bicycle (and potentially the cyclist) physically stationary. These methods require a laboratory form with dedicated instrumentation so as to precisely measure certain forces. The advantage is to allow independent measurement of the rolling and aerodynamics parameters. The instrument of choice for measuring aerodynamics is a wind tunnel, while a moving drum system is often preferred to measure rolling coefficient. The drawback is that this type of methodology introduces measurement biases. A wind tunnel has trouble reproducing the intrinsically turbulent nature of outdoor air; the drums introduce measurement biases relative to the diversity of the routes and temperature conditions that the cyclist ends up having to take while outside. Moreover, these laboratory methods have the major drawback of being very expensive and difficult for the general public to access.

On the contrary, the tests in motion are aimed at putting the cyclist and their bicycle under real conditions of movement. Certain parameters governing movement are then measured precisely so as to deduce the rolling and aerodynamic coefficients of the cyclist on their bicycle. The main difficulties reside in discerning the rolling and aerodynamics parameters, the resultant of which is an overall friction force that in practice is impossible to discern at constant speed.

This is because a moving cyclist is subjected to several forces:

The force of gravity:

$$F_{weight} = -mgp \quad [\text{equ.1}]$$

Where m is the mass of the cyclist, g the acceleration of gravity and p the slope of the road, the average slope being able to be expressed from H and L, respectively, the height (or grade) and the length of the road section traveled.

The force of dry friction (rolling force):

$$F_{rolling} = -mgC_r \quad [\text{equ.2}]$$

Where $C_r$ is the rolling coefficient (unitless).

The force of fluid friction (friction force with air):

$$F_{aero} = -0.5 \rho CxS\, v_{air}^2 \quad [\text{equ.3}]$$

Where $\rho$ is the air density, $v_{air}$ the speed of the air relative to the cyclist, i.e., the speed v of the vehicle plus the wind speed, Cx is the form factor of the vehicle, and S the frontal surface.

The forward force (force exerted by the cyclist on the pedals):

$$F_{forward} = \frac{P}{v} \quad [\text{equ.4}]$$

Where P is the driving power transmitted to the wheels and v the speed of the vehicle.

According to the fundamental equation of the dynamics:

$$\sum F = m \frac{dv}{dt} = F_{aero} + F_{weigh} + F_{rolling} + F_{forward} \quad [\text{equ.5}]$$

With the aim of minimizing the energy cost of the movement of the vehicle, it is particularly important to be able to accurately measure the friction applied to the cyclist (rolling and aerodynamics) expressed through the parameters $C_r$, rolling coefficient, and CxS, aerodynamic drag surface.

However, it can be seen that the equation that governs the movement of a cyclist involves multiple parameters m, $\rho$, $v_{air}$, v, CxS, $C_r$, H and L.

All the methods presented below make the hypothesis of a known mass m of the vehicle and a density $\rho$ of air, also known. On the other hand, in order to tell apart $C_r$ and CxS during one or more test movement(s), different strategies are employed to avoid having to know one or more remaining variables (H, $v_{air}$, v, CxS, $C_r$, L).

Document FR2725520 proposes a method that involves carrying out freewheeling several times, in a closed space, on a flat road, by very accurately reading the deceleration speed (typically using pressure bands arranged on the ground, respectively spaced from 1 m and 20 m with detection at 30 µs). This protocol makes it possible to perform several simplifications. Indeed, by moving on a perfectly flat, constantly paved closed circuit (such as a velodrome, a hangar or a gymnasium, for example), the height may be assumed to be zero and the rolling coefficient constant. In addition, by placing in a closed and unventilated place, $v_{air}$ can be likened to the speed of the cyclist v. Finally, by freewheeling (decelerating without applying motive force), the driving force can be assumed to be zero and only the inertia causes the cyclist to advance. On the basis of these hypotheses, an analytical equation of the movement can be deduced:

$$v(t) = \sqrt{\frac{\alpha}{\beta}} \tan\left[\sqrt{\alpha\beta}\left(t - \frac{1}{\sqrt{\alpha\beta}} \tan^{-1}\left(\sqrt{\frac{\beta}{\alpha}} v_0\right)\right)\right] \text{ where } \alpha = -gC_r,$$

$$\beta = -0.5 \frac{\rho}{m} CxS$$

and $v_0$ is the initial speed.

By very precisely measuring the movement (speed or distance and times when certain points are passed, using measurement bands or speed radar), the parameters $\alpha$ and $\beta$ can be approximated so as to deduce $C_r$ and CxS.

Relatively low variabilities of measurements were obtained via this method by multiplying the decelerations (standard deviations of 0.56% and 0.59% on CxS and $C_r$, respectively, by series of 30 decelerations). However, the difficulty of implementation (repeating tests, closed hangar, installing the measuring apparatus) makes this method generally unattractive despite the reliability of the results obtained.

Document WO2007038278 proposes a neighboring solution based on deceleration tests but this time on the outside, with wind and altitude measurement. It involves best matching a theoretical equation of movement to reality during an outdoor freewheeling test by adjusting the parameters CxS and $C_r$. In this protocol, the wind relative to the ground and the inclination of the road are measured via an on-board device and are no longer assumed to be zero.

This solution does not make it possible to achieve precise results. There are multiple sources of inaccuracies. For instance, the onboard tachometer (at 1 Hz sampling) introduces too many uncertainties to correctly describe a short movement by definition (freewheeling less than 100 m). The altitude measurement is also subject to too many inaccuracies. Indeed, it is based on an inclinometer, the value of which is likely to vary depending on the bearing on the bicycle and the calibration of which is complicated to reproduce in real conditions (bicycle+cyclist).

Another solution is based on regression tests. This involves multiple round trips (typically about ten), at increasing speeds, on a flat road portion that is not exposed to the wind and a constant coating (typically 1 km). In the case of a velodrome, the tests require a plurality of laps at increasing speed (J. Martin, A. Gardner, M. Barras, et al., "Aerodynamic drag area of cyclists determined with field-based measures," Sportscience 10-2006-68-69). Each lap or portion is carried out at the most constant possible speed and the energy expended on each segment or lap is measured by means of a power meter. The establishment of the relationship linking the developed energy and the high speed of the segment squared makes it possible to precisely calculate CxS and $C_r$.

The regression tests have proven to be able to measure very small differences of CxS, on the order of 1.5%. However, they are very tedious to implement because they require at least about ten kilometers of test travel, at different speeds. A result can thus be concretely obtained in less than 30 minutes.

In the same idea as above, assuming $C_r$ is known (for example, by regression test), it is possible to know CxS by performing just one round trip outside on a flat test path at constant speed. In this case, the wind may be assumed to be constant and non-zero.

This type of protocol is currently proposed (www.aertune.com/), with recommendations of use under low wind conditions and road grade of less than 0.5%. It is also recommended to take 3 round trips per test, to average the uncertainties, which involves relatively long procedures of at least 15-20 minutes per test.

Beyond its cumbersome implementation, there are serious questions about the accuracy of this protocol if the constant wind conditions are not fulfilled (wind fluctuation, or other vehicle on the path during the test, for example).

Furthermore, the virtual elevation method on a closed circuit is known, referred to as the "Chung method" (see publication "Estimating CdA with a power meter" by R. Chung, version updated in March 2012). It involves recalculating a so-called virtual altitude on a closed path without wind or an external vehicle, carried out several times, without braking, by making assumptions about the aerodynamic drag and the rolling coefficient $C_r$. The speed of the vehicle (cyclist on their bicycle), the power produced by the cyclist, and potentially the wind speed are measured by sensors. The slope p, then the grade H at each point of the circuit can then be recalculated by making assumptions as to $C_r$ and CxS:

$$p(t) = -\frac{1}{g}\frac{dv(t)}{dt} + \frac{P(t)}{mgv} - C_r - 0.5\frac{\rho CxS}{mg}v_{air}(t)^2 H(T) = \int_0^T p(t)dt$$

The realistic values of CxS and $C_r$ are those that make it possible to obtain an identical virtual elevation for each of the runs traveled.

This method was democratized by its implementation in smart phones, allowing data to be collected from numerous sensors present on the bicycle. Document GB2568885A is also known, which presents the production of a device making it possible to implement it using an anemometer attached to the fork of the bicycle. The Chung method nevertheless involves several constraints; first, it is necessary to be able to carry out a closed-loop run without braking, doing so in complete safety and without an external vehicle; in practice, a bowl-shaped path between two roundabouts without any significant curves. This kind of route is very difficult to find, especially in urban areas. Furthermore, this method does not precisely say how to tell apart the terms CxS and $C_r$. The solution found is indeed a possible torque (CxS, $C_r$). By setting an assumption for $C_r$, it is possible to observe the relative variation of CxS for different tests. However, the absolute value remains inaccessible. The other disadvantage of this method lies in the difficulty of performing a multitude of runs under the required weather conditions (without wind, when the wind is not being measured) in order to obtain the best measurement accuracy.

From the same author, document US 2012/0221257 describes a method for determining the aerodynamic drag surface CxS of a moving vehicle, depending on the characteristics of the wind. This method is notably based on the measurement of the wind speed and orientation during the movement, which makes it complex to implement.

Finally, document WO 2017/055759 discloses a solution based on the analysis of four movements (two round trips) on an outside path, for example, when freewheeling. The wind is assumed to be constant. In particular, one round trip is performed at low speed and one round trip is performed at high speed. The speed values are raised very precisely for each test using an onboard device. An algorithm makes it possible to deduce the coefficients $C_r$ and CxS as well as the average wind vent ($v_{air}$-v) from three equations derived from the energy conservation principle and based on three constraints on the grades of the path. In practice, arbitrary values of the parameters $C_r$, CxS and $v_{vent}$ initially set are corrected iteratively, connecting the errors committed on these parameters ($\Delta C_r$, $\Delta$CxS and $\Delta v_{vent}$) with the errors on the altitudes that emerge from the three aforementioned constraints. The resolution of such a system can be done, for example, by the Cramer method and results in the obtaining of corrections ($\Delta C_r$, $\Delta CxS$ and $\Delta v_{vent}$) to apply to the arbitrary values of the initially injected characteristic factors.

The method has the advantage of being able to be implemented externally, on a path exposed to the wind. In addition, its implementation is relatively short (at most 2 to 5 minutes per test). It also makes it possible to discern $C_r$ and $CxS$. Typical deviations of the order of 2% for $CxS$ and 4% for $C_r$ during repeatability tests have been recorded in calm winds.

The main drawback of this method lies in the fact that it is based on a relatively strong hypothesis that is the consistency of the wind during the four runs. However, the duration of the test (a few minutes) is on the order of magnitude of the characteristic wind variation time relative to the ground. This is why variation coefficients greater than 5% for $CxS$ can be recorded in a strong wind.

BRIEF SUMMARY

The present disclosure aims to remedy all or some of the aforementioned drawbacks. It relates to a preparatory sequence for determining the aerodynamic drag surface and the rolling coefficient of a vehicle, in particular, a cyclist on their bicycle. The present disclosure also relates to methods for determining one and/or another of these key friction parameters based on the preparatory sequence and that offer excellent reproducibility as well as great simplicity of implementation. The determination methods according to the present disclosure are particularly advantageous in the case of short test runs, typically less than 1 km.

The present disclosure relates to a preparatory sequence for determining the aerodynamic drag surface and/or the rolling coefficient of a vehicle under actual conditions of movement, without braking, on a defined road section having a point of departure and a point of arrival, the preparatory sequence comprising the following steps:
  a) defining a traffic lane with a width less than or equal to 1 m, along the road section,
  b) performing, by means of the vehicle, a first movement, on the road section, from the point of departure to the point of arrival, and in the traffic lane, during which the following parameters are measured:
    the speed of the air relative to the vehicle, with an anemometer having a sampling frequency greater than or equal to 1 Hz and a measurement repeatability of less than (or more than) 2% RMS for a sampling frequency of 1 Hz, or
    the dynamic pressure of the air, with a differential pressure sensor having a sampling frequency greater than or equal to 1 Hz and a measurement repeatability more than 4% RMS for a sampling frequency of 1 Hz,
    the speed of the vehicle at the points of departure and arrival of the road section, with a speed sensor having a repeatability of more than 0.25% RMS,
    the driving energy supplied by the vehicle along the road section, with a power sensor having a repeatability of more than 1% RMS, or considering zero driving energy if the movement is a freewheeling movement.

According to other advantageous non-limiting features of the present disclosure, taken alone or according to any technically feasible combination:
  the width of the traffic lane is less than or equal to 50 cm, or even to 30 cm, or even to 10 cm;
  the road section has a length greater than or equal to 500 m when driving energy is developed by the vehicle during the movement on the section;
  the road section has a length less than or equal to 300 m, preferably of the order of 100 m, when the movement on the section is a freewheeling movement;
  the road section has a descending gradient on the order of 0 to $-1\%$, and a length less than or equal to 500 m, preferably on the order of 200 m, when the movement on the section is a freewheeling movement;
  the vehicle speed measurement is based on counting the number of wheel revolutions of the vehicle per unit of time;
  the speed measurement of the vehicle implements one or more magnet(s) arranged on the wheel and a system for detecting the number of passages of the magnet(s) per unit of time, with a sampling frequency greater than or equal to 2 kHz;
  the speed measurement of the vehicle is obtained from at least two sensitive wheel detection bands, arranged respectively at the point of departure and at the point of arrival of the road section, capable of delivering an electrical pulse when the vehicle goes past, and coupled to a timing system having a sampling frequency greater than 2 kHz;
  the movement of step b) is preceded by a momentum phase, initiated at a point where the vehicle is set in motion located a known distance away from the point of departure or arrival, the distance being a multiple of one or a fraction of a wheel revolution, and a passage over the point of departure or the point of arrival of the road section, during the movement of step b), is detected accurately by counting the number of wheel turns from the moving point;
  a passage over the point of departure or the point of arrival of the road section is detected precisely by means of a satellite positioning system; and
  a passage over the point of departure or on the point of arrival of the road section is detected accurately by means of a radiofrequency beacon system positioned at the points of departure and/or arrival.

The present disclosure also relates to five methods for determining the aerodynamic drag surface and/or the rolling coefficient.

A first method for determining the aerodynamic drag surface implements the aforementioned preparatory sequence, and further comprises the following step:
  c) determining the aerodynamic drag surface from an equation derived from the energy conservation principle, and from:
    known parameters that are the mass of the vehicle, the acceleration of gravity, the density of the air (if necessary), the length of the section, the grade of the section,
    parameters measured during the first movement, and
    the rolling coefficient that is known or arbitrarily fixed.

A second method for determining the rolling coefficient implements the aforementioned preparatory sequence, and comprises the following step:
  d) determining the rolling coefficient from an equation derived from the energy conservation principle, and from:

known parameters that are the mass of the vehicle, the acceleration of gravity, the density of the air (if necessary), the length of the section, the grade of the section, parameters measured during the first movement, and the aerodynamic drag surface that is known or arbitrarily fixed.

A third method for determining the aerodynamic drag surface implements the aforementioned preparatory sequence, and comprises the following steps:

b') performing, by means of the vehicle, a second movement, on the road section, from the point of departure to the point of arrival, and in the traffic lane, during which the same parameters as in step b) are measured, c') determining the aerodynamic drag surface from an equation derived from the energy conservation principle, and from:

known parameters that are the mass of the vehicle, the acceleration of gravity, the density of the air (if necessary), the length of the section, and parameters measured during the first and second movements.

A fourth method for determining the aerodynamic drag surface and the rolling coefficient implements the aforementioned preparatory sequence, and further comprises the following steps:

b') performing, by means of the vehicle, a second movement, on the road section, from the point of departure to the point of arrival, and in the traffic lane, during which the same parameters as in step b) are measured, e) determining the aerodynamic drag surface and the rolling coefficient from an equation derived from the energy conservation principle, and from:

known parameters that are the mass of the vehicle, the acceleration of gravity, the density of the air (if necessary), the length of the section, the grade of the section, parameters measured during the first and second movements.

A fifth method for determining the aerodynamic drag surface and the rolling coefficient implements the aforementioned preparatory sequence, and further comprises the following steps:

b'') performing, by means of the vehicle, a second movement, on the road section, from the point of arrival to the point of departure, and in the traffic lane, during which the same parameters as in step b) are measured, b''') performing, by means of the vehicle, a third movement, on the road section, from the point of departure to the point of arrival, and in the traffic lane, during which the same parameters as in step b) are measured;

e') determining the aerodynamic drag surface and the rolling coefficient from an equation derived from the energy conservation principle, and from:

known parameters that are the mass of the vehicle, the acceleration of gravity, the density of the air (if necessary), the length of the section, and parameters measured during the first, second, and third movements.

Finally, the present disclosure relates to an integrated system for the implementation of one of the aforementioned methods for determining the aerodynamic drag surface and/or the rolling coefficient of a vehicle. The integrated system comprises:

an anemometer, having a sampling frequency greater than or equal to 1 Hz, for measuring the speed of the air relative to the vehicle, or a differential pressure sensor, having a sampling frequency greater than or equal to 1 Hz, for the measurement of the dynamic pressure of the air, a speed sensor corresponding to a chronometer associated with a reed switch, based on the detection of the number of passages of at least one magnet arranged on a wheel of the vehicle, with a frequency greater than or equal to 2 kHz, for measuring the speed of the vehicle, a computer for determining the aerodynamic drag surface and/or the rolling coefficient from the measured parameters and from known parameters that are arbitrarily pre-recorded.

Advantageously, the integrated system comprises means for remote communication with a mobile telephone or a screen.

It comprises, according to a preferred embodiment, an aerodynamic envelope in which the anemometer or one or more pressure-sampling elements of the differential pressure sensor, the speed sensor, and the computer are integrated, the aerodynamic envelope being arranged at the front of the vehicle.

BRIEF DESCRIPTION OF THE DRAWINGS

Other features and advantages of the present disclosure will emerge from the following detailed description of the present disclosure with reference to the appended figures, in which:

FIGS. 1A and 1B show a flat view and a sectional view of a road section on which the vehicle will move for the implementation of the preparatory sequence and methods for determining the friction coefficients of the vehicle, according to the present disclosure;

FIG. 2 shows a value result for the aerodynamic drag surface CxS and the rolling coefficient $C_r$, obtained from the fifth determination method according to the present disclosure, for a given test condition;

FIG. 3 shows results of values of the aerodynamic drag surface CxS, obtained from the first determination method according to the present disclosure, for five different test conditions;

FIG. 4 shows a possible implementation of an integrated system according to the present disclosure, on a time-trial handlebar of a bicycle, FIG. 5 shows results of aerodynamic drag surface values CxS, obtained during 16 tests carried out under identical test conditions: 8 tests (according to the present disclosure) were carried out while staying within the traffic lane and the values CxS were obtained from the first determination method according to the present disclosure; the other 8 tests (outside the present disclosure) were carried out without staying within the traffic lane and the values CxS were obtained on the same basis of determination method.

The figures are schematic depictions that, for the sake of readability, are not to necessarily scale.

DETAILED DESCRIPTION

The present disclosure relates to a preparatory sequence for determining the aerodynamic drag surface CxS and/or the rolling coefficient $C_r$ of a vehicle under real conditions of movement. This sequence, which takes the form of a method, is called preparatory because it constitutes an essential step that is common to the aforementioned methods for determining the friction coefficients, the methods also being subject to the present disclosure.

The preparatory sequence and the determination methods apply very particularly to a vehicle in the form of a cyclist mounted on a bicycle 1 (FIG. 1A). However, they could be applied to any other vehicle moving by supplying human or mechanical energy, such as, for example, a rolling, floating, or sliding vehicle, to name a few.

According to the present disclosure, the aim is to determine the friction coefficients of a vehicle, which are the aerodynamic drag surface CxS and the rolling coefficient $C_r$, under real conditions of movement, without braking, on a road section T defined and having a point of departure A and a point of arrival B. The point of departure A and the point of arrival B can be identified, for example, by beacons on the edge of the road and/or the glued or painted strips on the road. The road section T has a length L and a height (or grade), between the point of departure A and the point of arrival B, denoted H (FIGS. 1A and 1B).

Preparatory Sequence:

The preparatory sequence comprises a first step a) corresponding to the definition of a traffic lane C with a width less than or equal to 1 m, along the road section T. Advantageously, the width of the traffic lane is even less than or equal to 50 cm, or even to 30 cm, or even to 10 cm.

This first step can be carried out by identifying the traffic lane C, for example, by adhesive strips or marks painted along the road section T. Alternatively, the traffic lane C can be marked solely by a single continuous or discontinuous strip or line, which the vehicle will have to follow as closely as possible: in practice, the vehicle thus remains in a traffic lane C with a width of less than 50 cm.

Of course, the definition of a traffic lane C can be carried out by any other technique guaranteeing that the vehicle travels, along the road section T, within a band less than or equal to 1 m wide, as stated previously. In other words, it is desired to guarantee that the vehicle does not deviate, along the road section T, from its path by more than 50 cm.

The preparatory sequence then comprises a second step b) during which the vehicle performs a first movement, on the road section T, from the point of departure A to the point of arrival B, and in the traffic lane C.

This movement is carried out under particular test conditions, i.e., a particular configuration of the vehicle. Applied to a cyclist on their bicycle, the test conditions are defined by, in particular, a particular bicycle (wheels, handlebar, materials, etc.), a posture of the cyclist, clothing and a helmet worn by the cyclist, etc.

During the first movement, several parameters are measured. The air speed vain relative to the vehicle must be measured using an anemometer sensor having a sampling frequency greater than or equal to 1 Hz, or greater than or equal to 2 Hz, or greater than or equal to 4 Hz, or greater than or equal to 6 Hz, or greater than or equal to 8 Hz, or greater than or equal to 10 Hz, and a measurement repeatability more than 2% RMS at a sampling frequency of 1 Hz. This specifically means that the standard deviation of the difference between two competing measurements of the air speed at the sampling frequency of 1 Hz on the same bicycle in motion, during the same movement, must not exceed 2.8% (2%×root(2)). For a sampling frequency greater than 1 Hz, it is possible to tolerate a substantially higher repeatability, for example, for a frequency of 4 Hz, a measurement repeatability of more than 4% RMS (i.e., 2% RMS times the root of the sampling frequency) is required. Note that the air speed $v_{air}$ corresponds to the speed of the vehicle v, if the movement is performed in a closed place protected from the wind.

Alternatively to the measurement of the air speed, it is possible to measure the difference between the total pressure and the static pressure of the air, thanks to a differential pressure sensor. This air pressure difference, measured during the movement of the bicycle, corresponds to the dynamic pressure of the air. The differential pressure sensor must have a sampling frequency greater than or equal to 1 Hz, or greater than or equal to 2 Hz, or greater than or equal to 4 Hz, or greater than or equal to 6 Hz, or greater than or equal to 8 Hz, or greater than or equal to 10 Hz, and a measurement repeatability more than 4% RMS at a sampling frequency of 1 Hz. This means that the standard deviation of the difference between two competing measurements of the dynamic pressure at the sampling frequency of 1 Hz on the same bicycle in motion, during the same movement, must not exceed 5.6% (4%×root(2)). For a sampling frequency greater than 1 Hz, it is possible to tolerate a measurement repeatability that is substantially higher, as mentioned previously.

During the first movement, the speed of the vehicle v at the section's points of departure A and arrival B must also be measured with a repeatability of more than 0.25% RMS. This means that the standard deviation of the difference between two competing speed measurements of the same bicycle in motion, during the same movement, must not exceed 0.35% (0.25%×root(2)).

Finally, the driving energy $W_{mot}$ provided by the vehicle along the section is also measured, with a repeatability of more than 1% RMS; if the movement is a freewheeling movement, the measurement of the driving energy is not required and a zero driving energy is considered. The repeatability may be verified by competing the energy measurement system used with a reference power sensor, available commercially, of the type SRM or Verve Infocrank. The variability of the difference in energy measured between the energy measurement system and the reference power sensor over multiple runs must not exceed a standard deviation of 1%×root(2), i.e., 1.4%.

According to the present disclosure, the parameters measured during the movement must be under strict repeatability conditions, which requires repeatability performance from the sensors used. Recall that a random error is always present in a measurement and is closely related to the concept of the sensor's precision. The higher the precision of a sensor, the lower the variability of the fluctuations of its measurements due to random error, and the better the measurement repeatability the sensor. The random error is caused by inherently unpredictable fluctuations in the sensors. Random errors appear as different results for apparently the same repeated measurement. These errors have a tendency to be distributed normally due to the limiting central theorem since the stochastic error is often the sum of many independent random errors. They can be estimated by evaluating the repeatability of multiple measurements of a stable phenomenon, or when the measured phenomenon is not perfectly stable—as in the case of a cyclist moving under their own power—by having two simultaneous measurements of the same phenomenon compete against each other.

Let's take two sensors X and Y providing measurements $X_{mes}$ and $Y_{mes}$ of the same parameter Z. Let us assume these sensors are identical and assigned a random error of the same normally distributed intensity. This means that the measurement errors $x_{err}=x_{mes}-Z$ and $Y_{err}=Y_{mes}-Z$ both follow a normal probability law $N(\mu_{sysX}, \sigma^2)$ and $N(\mu_{sysY}, \sigma^2)$ where $\mu_{sysX}$ and $\mu_{sysY}$ are the systematic errors and $\sigma$ the standard deviation corresponding to the random error. The measurement repeatability of a sensor within the meaning of the present disclosure results in the contribution of the random error: a measurement repeatability of the parameter Z more than 2% RMS means that σ is less than or equal to 2%, or σ≤0.02×Z.

In practice, it is sometimes simpler and more pragmatic to have two simultaneous measurements of the same parameter Z compete against each other from two identical sensors X and Y to evaluate the standard deviation σ reflecting the random error. The difference in the measurements $X_{mes}-Y_{mes}$ follows a normal probability law $N(\mu_{sysX}-\mu_{sysY}, 2\sigma^2)$. By evaluating $X_{mes}-Y_{mes}$, it is possible to find the value of the standard deviation σ from a single sensor. For this purpose, it is sufficient to divide the standard deviation $\sigma_\Delta$ of $X_{mes}-Y_{mes}$ by root(2), i.e., about 1.4.

The measurement repeatability of a sensor within the meaning of the present disclosure can thus be assessed from the standard deviation $\sigma_\Delta$ of the difference $(X_{mes}-Y_{mes})$ between two competing measurements $X_{mes}$, $Y_{mes}$, of the parameter Z. The measurement repeatability of the parameter Z more than 2% RMS therefore also means that $\sigma_\Delta$ is less than or equal to root(2)×2%, or $\sigma_\Delta \le 0.028 \times Z$, the value of Z being estimated as the average of the measurements $X_{mes}$, $Y_{mes}$.

The air speed $v_{air}$ (or the dynamic pressure), in the case of a movement on a road section exposed to the wind, can be measured by an anemometer (respectively, by a differential pressure sensor) on board the bicycle. The sampling frequency, greater than or equal to 1 Hz, makes it possible to guarantee that the working of the aerodynamic force $W_{aero}$ (expressed below in equation [equ. 9], and consequently, the energy balance (expressed below in the equation [equ. 8]) and the unknowns the constituent ($C_r$ and/or CxS and/or H), are calculated in a sufficiently precise manner along the section, even when the air flows are variable and turbulent.

The anemometer (or the total pressure-sampling element of the differential pressure sensor) is placed in an area where the flow of the air around the vehicle does not disturb or only slightly disturbs the reading of the incident air. In the case of a bicycle, an area at mid-height between the top of the wheel and the handlebar and 0 to 1 m 50 in front of the cyclist is preferred. This zone is reached, for example, by virtue of an extension fixed to a support rigidly connected to the handlebar or the fork (FIG. 4).

Preferably, the measurement of the air speed vain or the measurement of the dynamic pressure ΔP can be carried out by means of a differential pressure sensor connected to a Pitot probe. The air speed is deduced from the pressure measurement by virtue of the following relationship:

$$V_{air} = k\sqrt{\frac{2\Delta P}{\rho}}$$

where ΔP (dynamic pressure) is the difference between total pressure and static pressure of air at the outlets of the Pitot tube, p the density of the air and k a calibration factor that can be determined during a round-trip test run where the average wind is assumed to be zero.

More generally, the dynamic pressure ΔP may be estimated via any type of differential pressure sampler, with the proviso that the two pressure-sampling ports have large differences in sensitivity to dynamic pressure. A calibration factor $k_p$ will make it possible to adjust the dynamic pressure $\Delta P_{actual}$ from the differential pressure measurement $\Delta P_{measured}$ via the relation $\Delta P_{actual} = k_p \times \Delta P_{measured}$. This factor will be to be determined according to the difference in sensitivity of the ports to the dynamic pressure.

The air speed in the case of a movement not exposed to the wind (for example, in a hangar, a velodrome, a gymnasium, etc.) may be assumed to be equal to the speed of the cyclist and measured using an on-board tachometer, for example, using the same method as that used for measuring speeds at points A and B described below.

The measurement of the speed of the vehicle v can be based on counting the number of wheel revolutions of the vehicle per unit of time at the points A of departure and B of arrival. According to an advantageous variant, the measurement of the speed of the vehicle implements one or more magnet(s) arranged on the wheel and a magnetic reed switch, sensitive to the passage of the magnets, placed on, for example, the fork in the case of a cycle. The switch is coupled to an electronic timer system capable of detecting the open and/or closed states of the switch with a resolution of less than 500 μs (or an upper sampling frequency of 2 kHz). The speed can be easily calculated thanks to the following relationship:

$$v = \frac{D_{wheel}}{\Delta_{top}} \frac{\beta}{2\pi}$$

where $\Delta_{top}$ is the measured time period between two successive rising (or falling) voltage edges measured at the terminals of the switch, $D_{wheel}$ is the diameter of the wheel, and β is the angle between the considered magnet and its predecessor (β=2π in the case of a single magnet measurement).

Alternatively, the measurement of the speed of the vehicle v can be obtained from at least two pairs of sensitive wheel detection strips: each pair is in this case arranged so as to encompass the points A of departure and B of arrival of the road section T. The pairs of strips can be made of a pressure-sensitive material, arranged on the ground parallel to one another at a distance; respectively, $d_A$ and $d_B$ around points A and B ($d_A$ and $d_B$ advantageously being less than 10 m) and placed perpendicularly to the lane by covering the entire width thereof. Each of the strips is able to deliver an electrical pulse when the vehicle goes past, and is coupled to a timer system intended to receive the electrical pulses and to determine the time interval between two consecutive pulses with a resolution of less than 500 μs (or an upper sampling frequency of 2 kHz). The velocities at points A and B can be calculated simply as follows:

$$v_A = \frac{d_A}{T_A} \text{ and } v_B = \frac{d_B}{T_B}$$

$T_A$ and $T_B$ being, respectively, the time intervals between two consecutive pulses measured during when the vehicle goes past the road section T at points A and B.

The driving energy $W_{mot}$ can be measured by means of a commercially available power sensor having the aforementioned repeatability characteristics. The data transmitted by the sensor are recovered thanks to the wireless transmission protocol of the sensor (Bluetooth®, ANT+™, etc.). The procedures for calibrating the sensor recommended by the manufacturer are applied before each test session.

In the case of freewheeling, the energy can be assumed to be zero and no power sensor is necessary in such a case. The cyclist can then advantageously continue to proceed with a simulated pedaling movement by turning their legs without pushing the pedals, so as to replicate an aerodynamic position corresponding to a dynamic pedaling situation.

Advantageously, the road section T has a length L greater than or equal to 500 m, when driving energy is developed by the vehicle during the first movement, or, as will be detailed below, with reference to the determination methods according to the present disclosure, during another movement on the section. However, when the first movement (or another movement) on the road section T is a freewheeling movement on a flat road, the section T has a length less than or equal to 300 m, preferably of the order of 100 m. Advantageously, a slightly sloping road between 0 and −1% gradient can be chosen so as to maximize the length of freewheeling beyond 200 m and thus minimize the impact of the uncertainties on the measurements. In the latter case, the section is only covered in one direction of circulation.

When the modes of implementation of step B) of the preparatory sequence make use of measurements carried out on board (speed with the passage of a magnet on the wheel being detected, the flow of the air with a dynamic anemometer or pressure with a differential pressure sensor, driving energy with a power sensor), it is important to be able to precisely synchronize temporally the data measured with the distance traveled between the points A of departure and B of arrival on the road section T. For this, several options are possible.

According to a first option, the movement of step b) is preceded by a momentum phase, initiated at a point M, M' where the vehicle begins moving, located at a known distance from the point of departure A or of arrival B: In practice, for more simplicity, the distance is chosen as a multiple of a wheel revolution of the vehicle or a wheel revolution fraction. This distance may typically be of the order of 200 m. Thus, a passage of the vehicle on the point of departure A or on the point of arrival b of the road section T, during the movement of step b) (or of another movement), is detected precisely by counting the number of wheel revolutions from the motion start point M, M'.

According to another option, the passage of the vehicle on the point of departure A or on the point of arrival B of the road section T can also be detected precisely by means of a satellite positioning system (GNSS). According to yet another option, a passage of the vehicle, on the point of departure A or on the point of arrival B of the road section T, is detected precisely by means of a radiofrequency beacon system positioned at the point of departure A and/or of arrival B.

The preparatory sequence according to the present disclosure defines optimal conditions for reconstituting the energy balance of the vehicle as faithfully as possible, in particular, for short test runs (less than 1 km), for which the variations in kinetic energy and potential energy (difference level) play a major role. Defining a restricted traffic lane along the road section T (step a) of the preparatory sequence) ensures an excellent level of constancy of the potential energy lost or acquired by gravity ($W_{weight}$, expressed below in the equation [equ. 10]) and optionally that lost by rolling ($W_{rolling}$, expressed below in the equation [equ. 11]), along the path during the first movement (and other movements, as will be apparent hereinafter).

The measurement of the speed v is very precise so as to know very exactly the variations in kinetic energy. Furthermore, the accuracy required for measuring the other parameters ($v_{air}$, $\Delta P$, $W_{mot}$) is also very high so as to faithfully reconstruct the energy balance of the vehicle and ultimately allow the determination of accurate values representative of the aerodynamic and/or rolling coefficients.

Energy Conservation Principle:

From an energy point of view along a road section T having a length L and a grade H, the equation [equ. 5] set forth in the introduction gives:

$$\int_0^L \sum F dx = \sum W = \int_0^L m \frac{dv}{dt} dx, \qquad [equ.6]$$

As dx=V dt, the following equation [equ. 7] can be deduced:

$$\Sigma W = \int_0^L m V dv = 0.5 m [V_{final}^2 - V_{ini}^2] \qquad [equ.7]$$

By breaking down the work generated by each force on a road section T, one obtains:

$$\Sigma W = W_{aero} + W_{weight} + W_{rolling} + W_{mot} = 0.5 m [V_{final}^2 - V_{ini}^2] \qquad [equ.8]$$

where $$W_{aero} = -\int_0^L 0.5 \rho CxS\, v_{air}^2 dx, \qquad [equ.9]$$

aerodynamic energy, which may also be expressed as $$W_{aero} = -\int_0^L CxS \Delta P\, dx$$

The latter expression of $W_{aero}$ is independent of the density of the air. When the dynamic pressure $\Delta P$ is measured instead of air speed, it is therefore not necessary to know the density of the air in the determination methods that will be described below.

$$W_{weight} = -mgH, \text{energy lost or acquired by gravity} \qquad [equ.10]$$

$$W_{rolling} = -mgC_r L, \text{energy lost by rolling} \qquad [equ.11]$$

$$W_{mot} = \int_0^L \frac{P}{V} dx = \int_0^L \frac{P}{dx} dt dx = \int_0^T P dt, \text{driving energy.} \qquad [equ.12]$$

The following relationship is thus obtained linking the grade H to the rest of the parameters:

$$H = \frac{0.5}{g}[V_{ini}^2 - V_{final}^2] - CxS\left[\frac{1}{mg}\int_0^L 0.5\rho v_{air}^2 dx\right] - C_r L + \frac{w_{mot}}{mg} \qquad [equ.13]$$

The methods for determining the friction coefficients CxS, $C_r$ of a vehicle that will now be detailed implement the preparatory sequence described and the equation [equ. 13] above, resulting from the principle of conservation of energy.

A first determination method:

The first method according to the present disclosure makes it possible to determine the aerodynamic drag surface CxS.

It implements steps a) and b) of the preparatory sequence and then comprises step c) corresponding to the determination of the aerodynamic drag surface CxS from the equation [equ. 13] derived from the principle of conservation of energy, and from:
   known parameters that are the mass m of the vehicle, the acceleration of gravity g, the density of the air ρ (if necessary), the length of the section L, the grade of the section H,
   parameters measured during the first movement of step b), and the rolling coefficient $C_r$ that is known or arbitrarily fixed.

The aerodynamic drag surface CxS can be expressed as follows:

$$CxS = \frac{K_v + \frac{W_{mot}}{mg} - H - C_r L}{K_a} \text{ where } K_a = \quad [\text{equ.14}]$$

$$\frac{1}{mg}\int_0^L 0.5\rho(v_{air})^2 dx = \frac{1}{mg}\int_0^L \Delta P dx, K_v = \frac{0.5}{g}\left[V_{ini}^2 - V_{fin}^2\right]$$

and $W_{mot}$ the driving energy supplied by the vehicle during the first movement, $V_{ini}$ and $V_{fin}$ corresponding respectively to an initial speed and to a final speed of the vehicle, respectively, to the point of departure A and to the point of arrival B of the section T during the first movement, $\Delta P$ corresponding to the dynamic pressure and $v_{air}$ corresponding to the speed of the air measured during the first movement.

Advantageously, the first movement of step b) is carried out at high speed: i.e., for a cyclist on their bicycle, at a speed greater than 20 km/h, for example, at 45 km/h. This makes it possible to maximize aerodynamic energy losses along the run and therefore to minimize the influence of uncertainty on $C_r$; this further makes it possible to approximate race speed conditions.

This first method for determining the aerodynamic drag surface CxS provides that the grade H of the section is known. It is also conceivable for the grade H of the road section T to be evaluated by virtue of a geodetic instrument such as an optical level 10 (FIG. 1B) or any other suitable topographical tool (theodolite system, for example), with an accuracy on the order of a millimeter, to be then used in the equation [equ. 14] above. It should be noted that this technique for measuring the grade H of the section T may be applied to the other determination methods that require it.

The rolling coefficient $C_r$ is either known or set arbitrarily. In the first case, an absolute value of the aerodynamic coefficient CxS may be obtained by the first determination method; in the second case, the value obtained for the coefficient will only be relative.

Recall that the aerodynamic drag surface CxS is related to the test conditions in which the vehicle made the first movement. Applied to a cyclist on their bicycle, the CxS coefficient is representative of the bicycle, a posture, clothing, a helmet of the cyclist, etc.

The first determination method according to the present disclosure therefore provides the possibility of repeating steps b) and c) (new movement), for other test conditions (i.e., for example, another headset, another posture of the cyclist, etc.). The values (absolute or relative) of the aerodynamic coefficient CxS obtained for the different test conditions can then be compared to identify the conditions more favorable to the aerodynamics of the vehicle.

Second Determination Method:

The second method according to the present disclosure makes it possible to determine the rolling coefficient $C_r$.

It implements steps a) and b) of the preparatory sequence and then comprises step d corresponding to the determination of the rolling coefficient $C_r$, from the equation [equ. 13] derived from the principle of conservation of energy, and from:

known parameters that are the mass m of the vehicle, the acceleration of gravity g, the density of the air ρ (if necessary), the length of the section L, the grade of the section H, parameters measured during the first movement, and the aerodynamic drag surface CxS that is known or arbitrarily fixed.

The rolling coefficient may be expressed as follows:

$$C_r = \frac{K_v + \frac{W_{mot}}{mg} - H - K_a CxS}{L} \text{ where } K_a = \quad [\text{equ.15}]$$

$$\frac{1}{mg}\int_0^L 0.5\rho(v_{air})^2 dx = \frac{1}{mg}\int_0^L \Delta P dx, K_v = \frac{0.5}{g}\left[V_{ini}^2 - V_{fin}^2\right]$$

and $W_{mot}$ the driving energy supplied by the vehicle during the first movement, $V_{ini}$ and $V_{fin}$ corresponding respectively to an initial speed and to a final speed of the vehicle, respectively, to the point of departure A and to the point of arrival B of the section T during the first movement, $\Delta P$ corresponding to the dynamic pressure and $v_{air}$ corresponding to the speed of the air measured during the first movement.

Advantageously, the first movement of step b) is carried out at low speed; i.e., in the case of a cyclist on their bicycle, at a speed of less than or equal to 20 km/h, for example, 15 km/h. This makes it possible to make the energy equation mainly dependent on the rolling coefficient losses and thus minimize the influence of the uncertainty of the other parameters.

This second method for determining the rolling coefficient $C_r$ provides that the grade H of the section is known or measured as mentioned above.

The rolling coefficient CxS is either known, or set arbitrarily. In the first case, an absolute value of the rolling coefficient $C_r$ may be obtained by the second determination method; in the second case, the value obtained for the coefficient will only be relative.

Recall that the rolling coefficient $C_r$ is related to the test conditions in which the vehicle made the first movement. Applied to a cyclist on their bicycle, the coefficient Cr is representative of the tires of the bicycle, of the type of road of the section, etc.

The second determination method according to the present disclosure therefore provides the possibility of repeating steps b) and d) (new movement), for other test conditions (i.e., for example, other tires, etc.). The values (absolute or relative) of the rolling coefficient $C_r$ obtained for the different test conditions can then be compared to identify the conditions more favorable to the rolling of the vehicle.

Third Determination Method:

The third method according to the present disclosure makes it possible to determine the aerodynamic drag surface CxS.

It implements steps a) and b) of the preparatory sequence and further comprises a step b') according to which the vehicle performs a second movement, on the road section T, from the point of departure A to the point of arrival B, i.e., in the same direction as the first movement of step b). The second movement also takes place in the traffic lane C and under the same test conditions as the first movement. The same parameters as in step b) are measured, namely the air speed $v_{air}$ or the dynamic pressure $\Delta P$, the speed of the vehicle v, in particular, at the point of departure A and at the point of arrival B, and the driving energy $W_{mot}$ if the movement is not a freewheeling movement.

The third method then comprises a step c'), which corresponds to the determination of the aerodynamic drag surface CxS from the equation [equ. 13] derived from the principle of conservation of energy, and from:
  known parameters that are the mass m of the vehicle, the acceleration of gravity g, the density of the air ρ (if necessary), the length of the section L, and
  parameters measured during the first and second movements.

The aerodynamic drag surface CxS can be expressed as follows: [equ. 16]

$$CxS = \frac{K_{v1} + \frac{W_{mot_1}}{mg} - K_{v2} - \frac{W_{mot_2}}{mg}}{K_{a1} - K_{a2}} \text{ where } K_{a_n} = \frac{1}{mg}\int_0^L 0.5\rho(v_{air_n})^2 dx = \frac{1}{mg}\int_0^L \Delta P_n dx \text{ and } K_{v_n} = \frac{0.5}{g}\left[V_{ini_n}^2 - V_{fin_n}^2\right]$$

and $W_{mot_n}$ the driving energy supplied by the vehicle, $V_{ini\_n}$ and $V_{fin\_n}$ corresponding respectively to an initial speed and a final speed of the vehicle for each movement, $\Delta P_n$ corresponding to the dynamic pressure and $v_{air\_n}$ corresponding to the speed of the air, during the movement n, with n=1, 2 corresponding respectively to the first and to the second movement.

Advantageously, either the first or the second movement is carried out at low speed, i.e., a speed less than or equal to 20 km/h, and the other is done at high speed, or, for example, a speed greater than 20 km/h. This makes it possible to reduce the influence of the uncertainties of the measurements $v_{air}$ or $\Delta P$, $W_{mot}$ and v on telling apart the coefficients $C_r$ and CxS.

This third method for determining the aerodynamic drag surface CxS means it is not necessary to know the grade H of the section T due to the performance of a second movement. Indeed, the grades H expressed according to the equation [equ. 13], respectively, for the first and the second movement, cancel out by subtracting the two expressions of the grades H, the latter being identical. The rolling coefficient $C_r$, which is also eliminated in the subtraction of the two expressions of the elevation differences, is also avoided, as is apparent in the equation [equ. 16].

The third determination method according to the present disclosure naturally provides the possibility of repeating steps b), b)' and c'), for other test conditions (i.e., for example, another headset, another posture of the cyclist, etc.). The absolute values of the aerodynamic coefficient CxS obtained for the different test conditions can then be compared to identify the conditions more favorable to the aerodynamics of the vehicle.

Fourth Determination Method:

The fourth method according to the present disclosure makes it possible to determine the aerodynamic drag surface CxS and the rolling coefficient $C_r$.

It implements steps a) and b) of the preparatory sequence and further comprises a step b') according to which the vehicle performs a second movement, on the road section T, from the point of departure A to the point of arrival B, i.e., in the same direction as the first movement of step b). The second movement also takes place in the traffic lane C and under the same test conditions as the first movement. The same parameters as in step b) are measured, namely the air speed $v_{air}$ or the dynamic pressure $\Delta P$, the speed of the vehicle v, in particular, at the point of departure A and at the point of arrival B, and the driving energy $W_{mot}$ if the movement is not a freewheeling movement.

The fourth method then comprises a step e) corresponding to the determination of the aerodynamic drag surface CxS and of the rolling coefficient $C_r$, from the equation [equ. 13] derived from the principle of conservation of energy, and from:
  known parameters that are the mass m of the vehicle, the acceleration of gravity g, the density of the air ρ (if necessary), the length of the section L, the grade of the section H,
  parameters measured during the first and second movements.

The aerodynamic drag surface CxS and the rolling coefficient $C_r$ can be expressed as follows:

$$CxS = \frac{K_{v1} + \frac{W_{mot_1}}{mg} - K_{v2} - \frac{W_{mot_2}}{mg}}{K_{a1} - K_{a2}} \quad [equ.17]$$

$$C_r = \frac{K_{v1} + \frac{W_{mot_1}}{mg} - H - K_{a1}CxS}{L} \text{ where } K_{a_n} = \frac{1}{mg}\int_0^L 0.5\rho(v_{air_n})^2 dx = \frac{1}{mg}\int_0^L \Delta P_n dx, K_{v_n} = \frac{0.5}{g}\left[V_{ini_n}^2 - V_{fin_n}^2\right] \quad [equ.18]$$

and $W_{mot_n}$ the driving energy supplied by the cyclist, $V_{ini\_n}$ and $V_{fin\_n}$ corresponding respectively to an initial speed and a final speed of the vehicle, $\Delta P_n$ corresponding to the dynamic pressure and $V_{air\_n}$ corresponding to the speed of the air, during the movement n, with n=1, 2 corresponding respectively to the first and to the second movement.

Advantageously, either the first or the second movement is carried out at low speed, i.e., a speed less than or equal to 20 km/h, and the other is done at high speed, or, for example, a speed greater than 20 km/h. This makes it possible to reduce the influence of the uncertainties of the measurements $v_{air}$ or $\Delta P$, $W_{mot}$ and v on telling apart the coefficients $C_r$ and CxS.

This fourth method for determining the aerodynamic drag surface and the rolling coefficient $C_r$ assumes that the grade H of the section T is known or measured by, for example, optical level as already stated.

It also provides the possibility of repeating steps b) and/or b') and e), for other test conditions: for example, with reference to the cyclist, with other tires for testing the rolling bearing, and/or other handlebars, helmets, clothing or posture for testing aerodynamics. The absolute values of the aerodynamic CxS and rolling coefficients $C_r$, obtained for the different test conditions can then be compared to identify conditions more favorable to the aerodynamics and rolling of the vehicle.

Fifth Determination Method:

The fifth method according to the present disclosure makes it possible to determine the aerodynamic drag surface CxS and the rolling coefficient $C_r$.

It implements steps a) and b) of the preparatory sequence and further comprises a step b') according to which the vehicle performs a second movement, on the road section T, from the point of arrival B to the point of departure A, i.e., in the reverse direction as the first movement of step b). The second movement also takes place in the traffic lane C and under the same test conditions as the first movement. The same parameters as in step b) are measured, namely the air speed $v_{air}$ or the dynamic pressure $\Delta P$, the speed of the vehicle v, in particular, at the point of departure A and at the point of arrival B, and the driving energy $W_{mot}$ if the movement is not a freewheeling movement.

The fifth method further comprises a step b") according to which the vehicle performs a third movement, on the road section T, from the point of departure A to the point of arrival B, i.e., in the same direction as the first movement of step b). The third movement takes place in the traffic lane C and under the same test conditions as the first and second movement. The same parameters as in step b) are measured.

The fifth method then comprises a step e') corresponding to the determination of the aerodynamic drag surface CxS and of the rolling coefficient $C_r$, from the equation [equ. 13] derived from the principle of conservation of energy, and from:

known parameters that are the mass m of the vehicle, the acceleration of gravity g, the density of the air $\rho$, the length of the section L, parameters measured during the first, second, and third movements.

The aerodynamic drag surface CxS and the rolling coefficient $C_r$ can be expressed as follows:

$$CxS = \frac{K_{v1} + \frac{W_{mot_1}}{mg} - K_{v3} - \frac{W_{mot_3}}{mg}}{K_{a1} - K_{a3}} \quad \text{[equ.19]}$$

$$C_r = \frac{1}{2L}\left[-\frac{K_{v1} - K_{v3}}{K_{a1} - K_{a3}}(K_{a1} + K_{a2}) + K_{v1} + \frac{W_{mot_1}}{mg} + K_{v2} + \frac{W_{mot_2}}{mg}\right] \quad \text{[equ.20]}$$

where $K_{a_n} = \frac{1}{mg}\int_0^L 0.5\rho(v_{air_n})^2 dx =$ $\frac{1}{mg}\int_0^L \Delta P_n dx$ and $K_{v_n} = \frac{0.5}{g}\left[V_{ini_n}^2 - V_{fin_n}^2\right]$ and $W_{mot_n}$ the driving energy supplied by the cyclist, $V_{ini\_n}$ and Vann corresponding respectively to an initial speed and a final speed of the vehicle, $\Delta P_n$ corresponding to the dynamic pressure and $v_{air\_n}$ corresponding to the speed of the air, during the movement n, with n=1, 2, 3 corresponding respectively to the second and to the third movement.

Advantageously, the first or the second movement is carried out at low speed, for example, at a speed less than or equal to 20 km/h. The third movement is carried out at high speed (for example, at a speed greater than 20 km/h) if the first movement has been carried out at a speed of less than or equal to 20 km/h; or the third movement is carried out at low speed (for example, a speed less than or equal to 20 km/h) if the first movement has been carried out at a speed greater than 20 km/h. This makes it possible to reduce the influence of the measurements uncertainties $v_{air}$ or $\Delta P$, $W_{mot}$ and v during the runs and thus promote better discernment of the coefficients $C_r$ and CxS.

This fifth method for determining the aerodynamic drag surface CxS also makes it possible to determine the grade H of the section T due to the performance of a second movement and a third movement. H is then expressed as follows:

$H = K_{v_n} - CxSK_{a_n} - C_r L$ with n corresponding to one of the three movements that can be chosen.

It also provides the possibility of repeating steps b") or b") and e'), for other test conditions: for example, with reference to the cyclist, other tires for testing the rolling bearing, and/or other handlebars, helmets, clothing or posture for testing aerodynamics. The absolute values of the aerodynamic CxS and rolling coefficients $C_r$, obtained for the different test conditions can then be compared to identify conditions more favorable to the aerodynamics and rolling of the vehicle.

Note that measurements of the pressure, temperature and optionally the humidity level can be carried out during step b) of the preparatory sequence, in order to evaluate the density of the air in real-time $\rho$. Optionally, these measurements can also be carried out during steps b'), b") or b") of the third, fourth and/or fifth determination methods described. These measurements can also be omitted in the case of a direct measurement of the dynamic pressure.

Advantageously, the movements during steps b), b'), b") and b") of the third, fourth and/or fifth determination methods are performed freewheeling. This limits the duration of each step and provides excellent precision and reproducibility for the determination of the friction coefficients CxS, $C_r$.

Example embodiments of methods according to the present disclosure for a cyclist:

Before performing a series of tests, the user defines a route and track on the ground, a traffic land using a paint can. It places visual markers at the points A of departure and B of arrival spaced apart by exactly 48 wheel turns. It also traces two lines located 91 revolutions of the wheel; respectively, upstream and downstream of the points A of departure and B of arrival; these are points M and M'. The user then installs a magnet on their front wheel as well as a magnetic switch for detecting when they go past on the fork of their bicycle. The device equipped with its Pitot probe, for measuring the air speed, is installed on the handlebar of the bicycle. The user checks that the probe is clearly horizontal and calibrated. Recalibration is useful only if the location of the probe on the vehicle is changed.

The user then rises on a weighing scale with all of the equipment that they will use during the tests to define the mass of the vehicle. The circumference of the wheel on which the speed is measured (typically the front wheel) is also determined.

The length of the test run—48 wheel revolutions—as well as the distances of the lines located upstream and downstream of the start and arrival lines 91 of wheel—are fixed. With the bicycle placed in the forward direction, the user aligns the bicycle on the point M so as to place the wheel in contact with the line drawn on the ground while having the magnet at half-stroke relative to the magnetic switch, so that the first detection of the passage of the magnet is located at a half-revolution of the wheel from the point M. This makes it possible to perfectly align the forward and return runs. The fifth determination method described above is then engaged.

The cyclist sets off in the direction of point A at 15 km/h approximately. Just before passing that point, they start freewheeling. The cyclist then takes care to strictly not modify the chosen position (test conditions) and to remain in the traffic lane marked on the ground. Once the point B has been passed, they start to pedal in the direction of M'. They then repeat this sequence but starting from point M' in the direction of point B. Once this second low-speed freewheel has been carried out, they then aligns their wheel with point M. They can then move to point A at a speed of approximately 45 km/h by maintaining a position identical to that of the desired test. Just before passing point A, they start freewheeling. Between the points A and B they make sure not to change position and to stay within the traffic lane C marked on the ground.

Once the point B has been passed, the values of the coefficients $C_r$ and CxS can be determined (step e' of the fifth method) as well as the height H of the path (FIG. 2).

If the user wishes to perform a new test, they may implement, for example, the first determination method described, or repeat steps b") or b") and e) of the fifth method. They then set off in the direction of the point A at approximately 45 km/h. Just before passing that point, they start freewheeling. The cyclist then takes care to strictly not modify the chosen position and to remain in the traffic lane C marked on the ground. Once the point B has been passed, the value of CxS representative of the new test conditions is determined. The cyclist can then restart the procedure by repeating this sequence but starting this time from point M', in the direction of point B, and so on for a plurality of test conditions.

FIG. 3 gives an example of 22 freewheel tests that made it possible to test 5 different configurations. It emerges from the series of tests that the helmet 2 has an aerodynamic surface approximately 0.006 m² larger than helmet 2 and that position 2 is more unfavorable than position 1 by approximately 0.005 m². It appears here that the determination methods according to the present disclosure make it possible to compare and discriminate different test conditions thanks to excellent sensitivity and high precision, while retaining a simple, rapid and not very restrictive operating mode in the choice of road section T.

FIG. 5 shows the effect of staying within the traffic lane defined in the present disclosure. The table in FIG. 5 shows aerodynamic drag surface values CxS, obtained during 16 tests carried out under identical test conditions: 8 tests (according to the present disclosure) were carried out while staying within the traffic lane and the values CxS were obtained from the first determination method according to the present disclosure; the other 8 tests were carried out without staying within the traffic lane (therefore outside the present disclosure) and the values CxS were obtained on the same basis of determination method. It appears clearly that the dispersion of the results is three times greater for the tests outside the present disclosure than for the tests according to the present disclosure. The technical effect of staying within the traffic lane is to ensure consistency of the following parameters during movements on the road section T: grade, length of the path, and also rolling coefficient when attempting to determine the aerodynamic drag surface CxS. Staying within this lane makes it possible to ensure that the variations in energy measured during the different tests are not related to variations in these parameters.

Conversely, not staying within the traffic lane involves variations in these parameters assumed to be constant in several methods of the prior art. These variations are likely to affect the reproducibility of the measurements as stated with reference to FIG. 5.

Integrated System:

The present disclosure also relates to an integrated system 100 for implementing a method for determining the aerodynamic drag surface CxS and/or the rolling coefficient $C_r$ of a vehicle, as described above.

The integrated system 100 comprises an anemometer 101, having a sampling frequency greater than or equal to 1 Hz and a measurement repeatability more than 2% RMS for a sampling frequency of 1 Hz, for measuring the air speed $v_{air}$ relative to the vehicle. Alternatively, the integrated system 100 comprises a differential pressure sensor having a sampling frequency greater than or equal to 1 Hz and a measurement repeatability more than 4% RMS for a sampling frequency of 1 Hz. It also comprises a speed sensor, based on detecting of the number of times at least one magnet arranged on a wheel of the vehicle goes past, at a frequency greater than or equal to 2 kHz and having a repeatability of more than 0.25% RMS, for measuring the speed of the vehicle v. Finally, the integrated system 100 comprises a computer for determining the aerodynamic drag surface CxS and/or the rolling coefficient $C_r$ from the measured parameters and from known parameters that are arbitrarily pre-recorded.

The integrated system is typically capable of displaying on a screen 102 the information presented in FIG. 2.

According to a variant, the integrated system 100 comprises means for remote communication with a mobile telephone or a screen, giving real-time access to the results.

According to another advantageous variant, the system comprises an aerodynamic envelope in which the anemometer or the total pressure-sampling element of the differential pressure sensor, the speed sensor, and the computer are integrated, the aerodynamic envelope being arranged at the front of the vehicle. The casing is preferably placed in a pressure zone that is not influenced by the vehicle or only slightly so, for example, between the top of the front wheel and the handlebar in the case of a bicycle via an attachment secured to the frame, fork, or handlebar as shown in FIG. 4. In this figure, the system 100 comprises a Pitot probe anemometer 101 as well as a computer capable of guiding the user in selecting one of the five methods for determining the aerodynamic drag surface and/or the rolling coefficient of the cyclist on the bicycle thereof as well as displaying the information presented in FIG. 2.

Of course, the present disclosure is not limited to the described embodiments and examples, and variant embodiments can be provided thereto without departing from the scope of the invention as defined by the claims.

The invention claimed is:

1. A method comprising a preparatory sequence for determining an aerodynamic drag surface and/or a rolling coefficient of a vehicle under actual conditions of movement, without braking, on a defined road section having a point of departure and a point of arrival, the preparatory sequence comprising the following steps:
   a) defining a traffic lane with a width less than or equal to 1 m, along the road section, and
   b) performing, by way of the vehicle, a first movement, on the road section, from the point of departure to the point of arrival, and in the traffic lane, and measuring the following parameters during the first movement:
      the speed of the air relative to the vehicle, with an anemometer having a sampling frequency greater than or equal to 1 Hz and a measurement repeatability more than 2% RMS for a sampling frequency of 1 Hz,
      or the dynamic pressure of the air, with a differential pressure sensor having a sampling frequency greater than or equal to 1 Hz and a measurement repeatability more than 4% RMS for a sampling frequency of 1 Hz,
      the speed of the vehicle at the points of departure and arrival of the road section, with a speed sensor having a repeatability of more than 0.25% RMS, and
      the driving energy supplied by the vehicle along the road section, with a power sensor having a repeatability of more than 1% RMS, or considering zero driving energy if the movement is a freewheeling movement.

2. The method of claim 1, wherein the width of the traffic lane is less than or equal to 50 cm.

3. The method of claim 1, wherein the road section has a downward gradient on the order of 0 to −1%, and a length of less than or equal to 500 m.

4. The method of claim 1, wherein the measurement of the speed of the vehicle comprises placing one or more magnets on a wheel and detecting a number of passages of the magnets per unit of time, with a sampling frequency greater than or equal to 2 kHz.

5. The method of claim 1, wherein the measurement of the speed of the vehicle is obtained from at least two sensitive wheel detection bands, arranged respectively at the point of departure and at the point of arrival of the road section, capable of delivering an electrical pulse when the vehicle goes past, and coupled to a timing system having a sampling frequency greater than 2 kHz.

6. The method of claim 1, further comprising the following step:
   c) determining the aerodynamic drag surface from an equation derived from the energy conservation principle, and from:
      known parameters that are the mass of the vehicle, the acceleration of gravity, the density of the air, the length of the section, the grade of the section,
      parameters measured during the first movement, and
      the rolling coefficient that is known or arbitrarily fixed.

7. The method of claim 1, further comprising the following step:
   d) determining the rolling coefficient from an equation derived from the energy conservation principle, and from:
      known parameters that are the mass of the vehicle, the acceleration of gravity, the density of the air, the length of the section, the grade of the section,
      parameters measured during the first movement, and
      the aerodynamic drag surface that is known or arbitrarily fixed.

8. The method of claim 1, further comprising the following steps:
   b') performing, by way of the vehicle, a second movement, on the road section, from the point of departure to the point of arrival, and in the traffic lane, during which the same parameters as in step b) are measured,
   c') determining the aerodynamic drag surface from an equation derived from the energy conservation principle, and from:
      known parameters that are the mass of the vehicle, the acceleration of gravity, the density of the air, the length of the section, and
      parameters measured during the first and second movements.

9. The method of claim 1, the method further comprising the following steps:
   b') performing, by way of the vehicle, a second movement, on the road section, from the point of departure to the point of arrival, and in the traffic lane, during which the same parameters as in step b) are measured, and
   e) determining the aerodynamic drag surface and the rolling coefficient from an equation derived from the energy conservation principle, and from:
      known parameters that are the mass of the vehicle, the acceleration of gravity, the density of the air, the length of the section, the grade of the section, and
      parameters measured during the first and second movements.

10. The method of claim 6, further comprising evaluating a grade of the road section using an optical level or a topographical tool, with an accuracy of at least one millimeter.

11. The method of claim 1, the method further comprising the following steps:
    b") performing, by way of the vehicle, a second movement, on the road section, from the point of arrival to the point of departure, and in the traffic lane, during which the same parameters as in step b) are measured,
    b") performing, by way of the vehicle, a third movement, on the road section, from the point of departure to the point of arrival, and in the traffic lane, during which the same parameters as in step b) are measured;
    e') determining the aerodynamic drag surface and the rolling coefficient from an equation derived from the energy conservation principle, and from:
       known parameters that are the mass of the vehicle, the acceleration of gravity, the density of the air, the length of the section, and
       parameters measured during the first, second, and third movements.

12. The method of claim 6, further comprising measuring the pressure, the temperature and the humidity level during step b) of the preparatory sequence and evaluating in real-time the density of the air.

13. An integrated system for implementing a method for determining the aerodynamic drag surface of a vehicle, the integrated system comprising:
    an anemometer, having a sampling frequency greater than or equal to 1 Hz, for measuring the speed of the air relative to the vehicle, or a differential pressure sensor, having a sampling frequency greater than or equal to 1 Hz, for the measurement of the dynamic pressure of the air;
    a speed sensor, based on the detection of the number of passages of at least one magnet arranged on a wheel of the vehicle, at a frequency greater than or equal to 2 kHz, for measuring the speed of the vehicle; and
    a computer for determining the aerodynamic drag surface and/or the rolling coefficient from the measured parameters and from known parameters that are arbitrarily pre-recorded, the computer being configured to perform a method comprising:
       implementing a preparatory sequence for determining an aerodynamic drag surface and/or a rolling coefficient of a vehicle under actual conditions of movement, without braking, on a defined road section having a point of departure and a point of arrival, the preparatory sequence comprising the following steps:
          a) defining a traffic lane with a width less than or equal to 1 m, along the road section, and
          b) performing, by way of the vehicle, a first movement, on the road section, from the point of departure to the point of arrival, and in the traffic lane, and measuring the following parameters during the first movement:
             the speed of the air relative to the vehicle, with an anemometer having a sampling frequency greater than or equal to 1 Hz and a measurement repeatability more than 2% RMS for a sampling frequency of 1 Hz,
             or the dynamic pressure of the air, with a differential pressure sensor having a sampling frequency greater than or equal to 1 Hz and a measurement repeatability more than 4% RMS for a sampling frequency of 1 Hz, the speed of the vehicle at the points of departure and arrival of the road section, with a speed sensor having a repeatability of more than 0.25% RMS, and the driving energy supplied by the vehicle along the road section, with a power sensor having a repeatability of more than 1% RMS, or considering zero driving energy if the movement is a freewheeling movement, the method further comprising:

determining the aerodynamic drag surface from an equation derived from the energy conservation principle, and from:

known parameters that are the mass of the vehicle, the acceleration of gravity, the density of the air, the length of the section, the grade of the section, parameters measured during the first movement, and the rolling coefficient that is known or arbitrarily fixed.

14. An integrated system for implementing a method for determining the aerodynamic drag surface of a vehicle, the integrated system comprising:

an anemometer, having a sampling frequency greater than or equal to 1 Hz, for measuring the speed of the air relative to the vehicle, or a differential pressure sensor, having a sampling frequency greater than or equal to 1 Hz, for the measurement of the dynamic pressure of the air;

a speed sensor, based on the detection of the number of passages of at least one magnet arranged on a wheel of the vehicle, at a frequency greater than or equal to 2 kHz, for measuring the speed of the vehicle; and a computer for determining the aerodynamic drag surface and/or the rolling coefficient from the measured parameters and from known parameters that are arbitrarily pre-recorded, wherein the computer is configured to perform a method comprising:

implementing a preparatory sequence for determining an aerodynamic drag surface and/or a rolling coefficient of a vehicle under actual conditions of movement, without braking, on a defined road section having a point of departure and a point of arrival, the preparatory sequence comprising the following steps:

a) defining a traffic lane with a width less than or equal to 1 m, along the road section, and b) performing, by way of the vehicle, a first movement, on the road section, from the point of departure to the point of arrival, and in the traffic lane, and measuring the following parameters during the first movement:

the speed of the air relative to the vehicle, with an anemometer having a sampling frequency greater than or equal to 1 Hz and a measurement repeatability more than 2% RMS for a sampling frequency of 1 Hz, or the dynamic pressure of the air, with a differential pressure sensor having a sampling frequency greater than or equal to 1 Hz and a measurement repeatability more than 4% RMS for a sampling frequency of 1 Hz, the speed of the vehicle at the points of departure and arrival of the road section, with a speed sensor having a repeatability of more than 0.25% RMS, and the driving energy supplied by the vehicle along the road section, with a power sensor having a repeatability of more than 1% RMS, or considering zero driving energy if the movement is a freewheeling movement, the method further comprising:

performing, by way of the vehicle, a second movement, on the road section, from the point of departure to the point of arrival, and in the traffic lane, during which the same parameters as in step b) are measured, determining the aerodynamic drag surface from an equation derived from the energy conservation principle, and from:

known parameters that are the mass of the vehicle, the acceleration of gravity, the density of the air, the length of the section, and parameters measured during the first and second movements.

* * * * *